United States Patent [19]

Johnson

[11] Patent Number: 5,243,147
[45] Date of Patent: Sep. 7, 1993

[54] FISHING ROD SCALE APPARATUS

[76] Inventor: Chris Johnson, HCR 68, Box 319, Iaeger, W. Va. 28444

[21] Appl. No.: 858,230

[22] Filed: Mar. 26, 1992

[51] Int. Cl.[5] .................... G01G 21/28; G01G 19/60
[52] U.S. Cl. .................................... 177/245; 177/132
[58] Field of Search ..................... 177/127, 132, 245

[56] References Cited

U.S. PATENT DOCUMENTS

| | | | |
|---|---|---|---|
| 735,003 | 7/1903 | Ward | 177/132 |
| 1,031,917 | 7/1912 | Dennison | 177/132 |
| 1,174,526 | 3/1916 | Stoddart | 177/132 |

Primary Examiner—George H. Miller, Jr.
Attorney, Agent, or Firm—Leon Gilden

[57] ABSTRACT

A fishing rod includes a handle, with a lower handle positioned below the fishing rod handle, with the lower handle mounting a scale assembly therewithin. The scale assembly is in operative communication with a support cable for positioning a fish for a measuring procedure.

4 Claims, 4 Drawing Sheets

FIG. 1
FIG. 2
FIG. 3
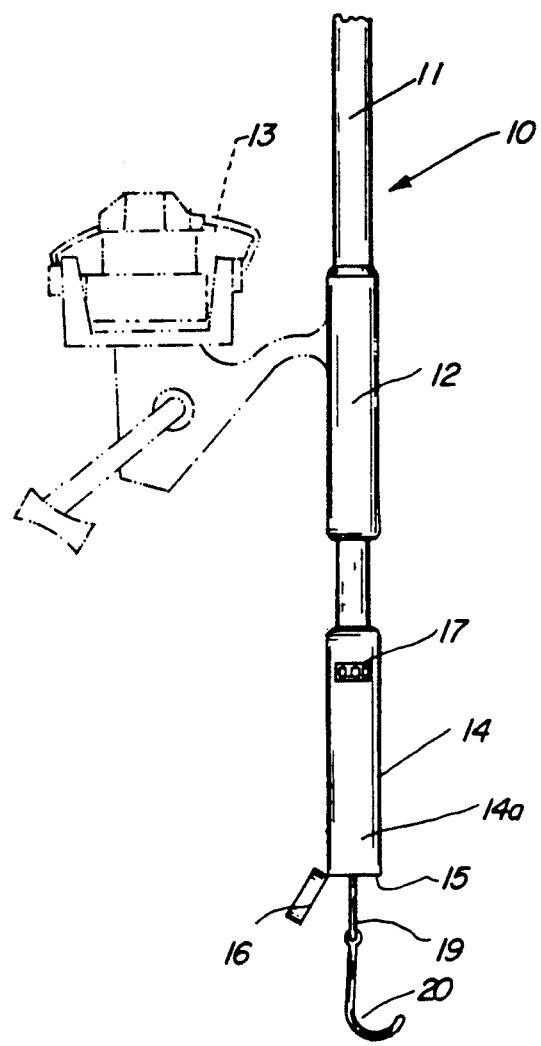
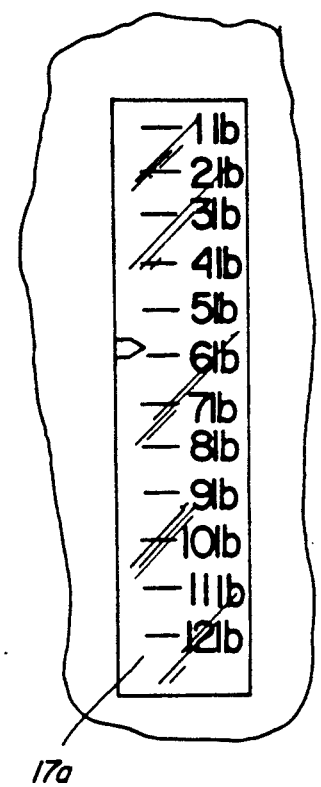
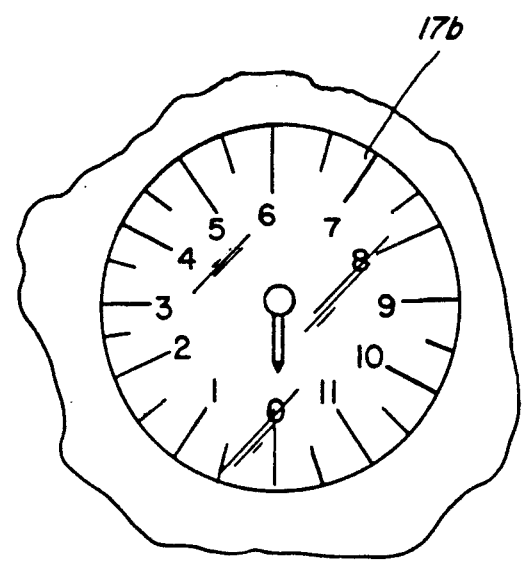

FIG. 4
FIG. 5
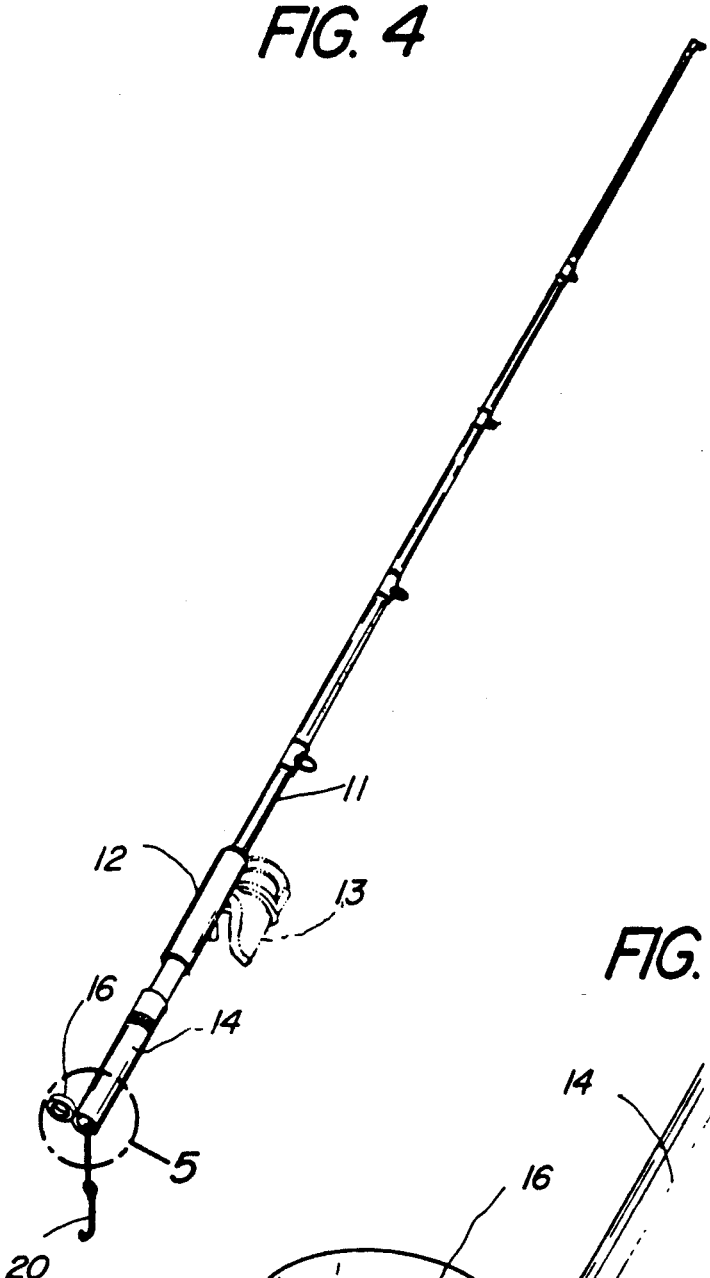
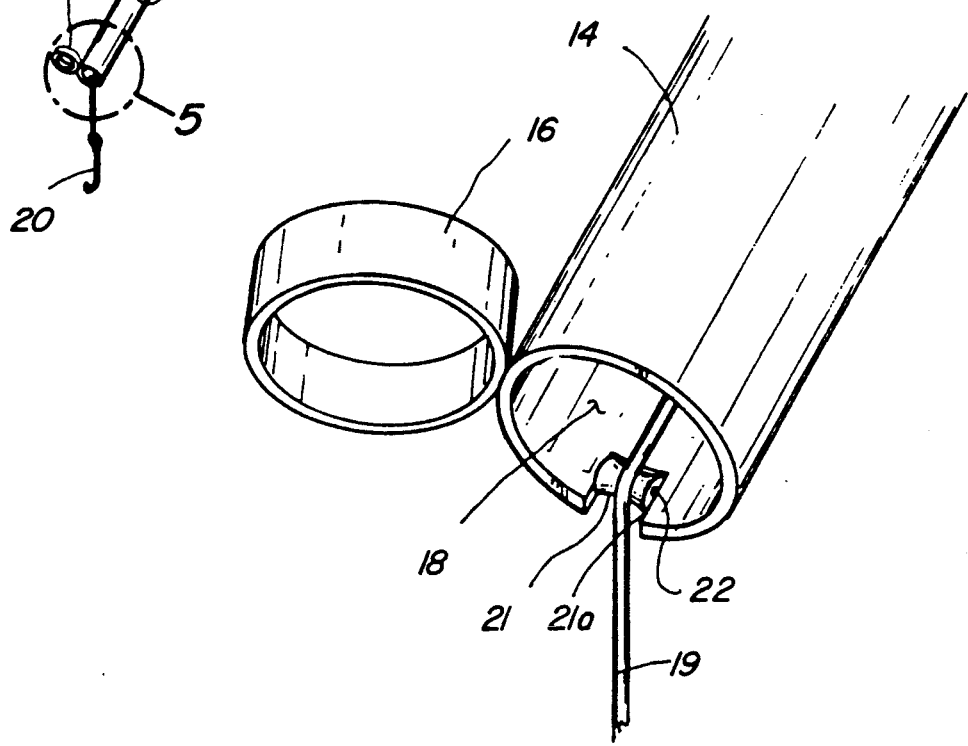

FISHING ROD SCALE APPARATUS

BACKGROUND OF THE INVENTION

1. Field of the Invention

The field of invention relates to fishing apparatus, and more particularly pertains to a new and improved fishing rod scale apparatus wherein the same is arranged to permit the weighing of fish caught by the fishing structure of the organization.

2. Description of the Prior Art

Fishing rod scale apparatus of various types have been utilized in the prior art for the weighing of fish captured during a fishing event. Such apparatus has typically been of a structure requiring dexterity in the manipulation of a fish for use of such organization. Such apparatus is exemplified in the U.S. Pat. No. 4,765,420 to Mengo setting forth a fishing scale structure mounted to a handle of a fish net.

U.S. Pat. No. 4,785,897 to Keinert, Jr. sets forth a further example of a scale member mounted in association with a fishing net structure.

U.S. Pat. Nos. 4,721,174 to Letzo; 4,936,399 to Christman; and 4,697,655 to Junks set forth examples of scale members utilized relative to fishing rods.

As such, it may be appreciated that there continues to be a need for a new and improved fishing rod scale apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of fishing apparatus now present in the prior art, the present invention provides a fishing rod scale apparatus wherein the same utilizes a fishing scale mounted within a lower handle portion of an associated fishing rod permitting access to the scale structure through an end cap closure. As such, the general purpose of the present invention, which will be described subsequently in greater detail, is to provide a new and improved fishing rod scale apparatus which has all the advantages of the prior art fishing apparatus and none of the disadvantages.

To attain this, the present invention provides a fishing rod including a handle, with a lower handle positioned below the fishing rod handle, with the lower handle mounting a scale assembly therewithin. The scale assembly is in operative communication with a support cable for positioning a fish for a measuring procedure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved fishing rod scale apparatus which has all the advantages of the prior art fishing rod apparatus and none of the disadvantages.

It is another object of the present invention to provide a new and improved fishing rod scale apparatus which may be easily and efficiently manufactured and marketed.

It is a further object of the present invention to provide a new and improved fishing rod scale apparatus which is of a durable and reliable construction.

An even further object of the present invention is to provide a new and improved fishing rod scale apparatus which is susceptible of a low cost of manufacture with regard to both materials and labor, and which accordingly is then susceptible of low prices of sale to the consuming public, thereby making such fishing rod scale apparatus economically available to the buying public.

Still yet another object of the present invention is to provide a new and improved fishing rod scale apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of the instant invention.

FIG. 2 is an orthographic view of a further example of a scale structure utilized by the invention.

FIG. 3 is an orthographic view of a further scale read-out dial arranged for employment by the invention as an alternative to the structure as set forth in the FIGS. 1 and 2.

FIG. 4 is an isometric illustration of the invention.

FIG. 5 is an orthographic view of section 5, as set forth in FIG. 4.

DESCRIPTION OF THE PREFERRED EMBODIMENT

Figure 6:
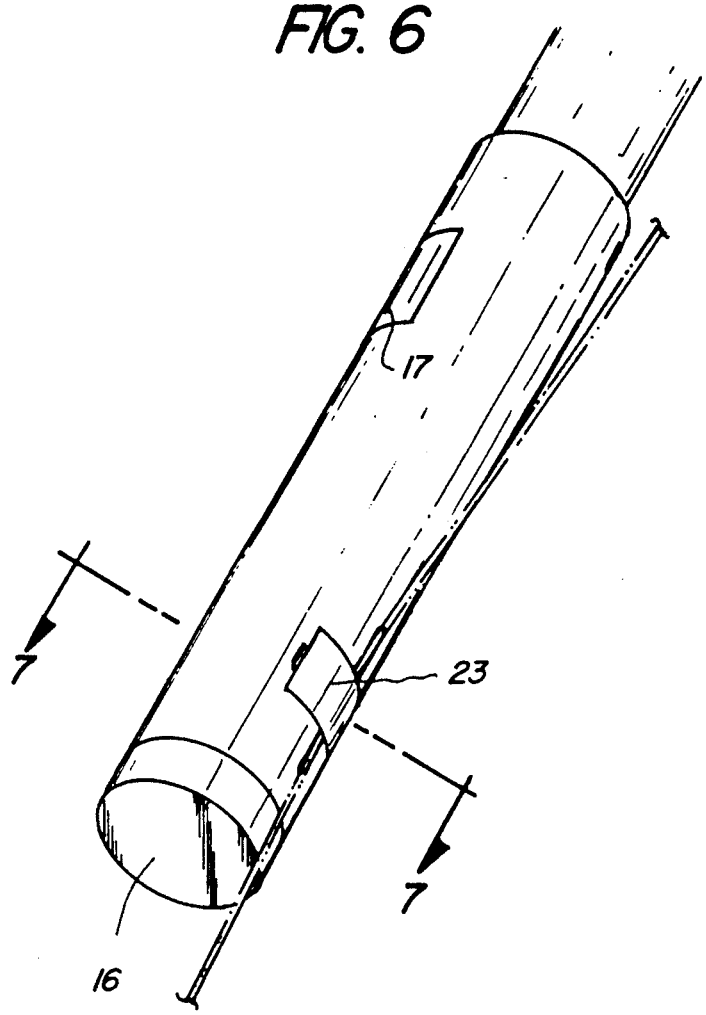
FIG. 6 is an isometric illustration of a modified lower handle structure utilized by the invention.
Figure 7:
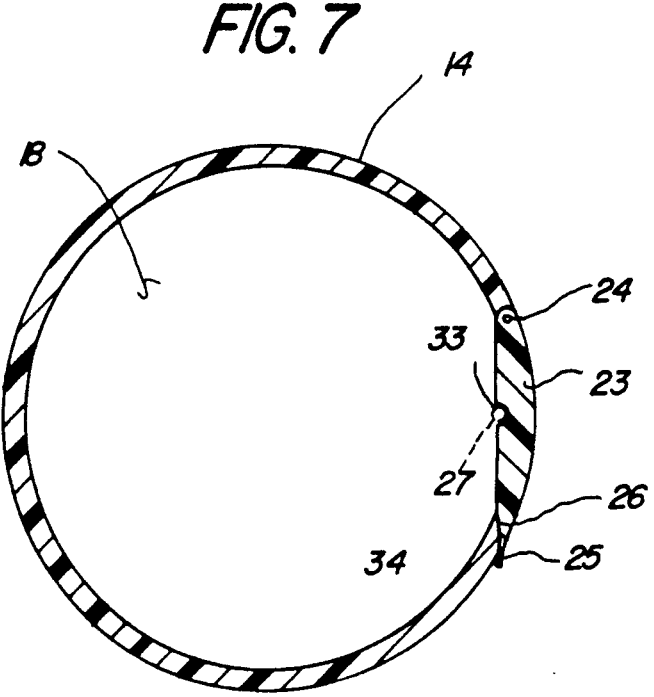
FIG. 7 is an orthographic view, taken along the lines 7—7 of FIG. 6 in the direction indicated by the arrows.
Figure 8:
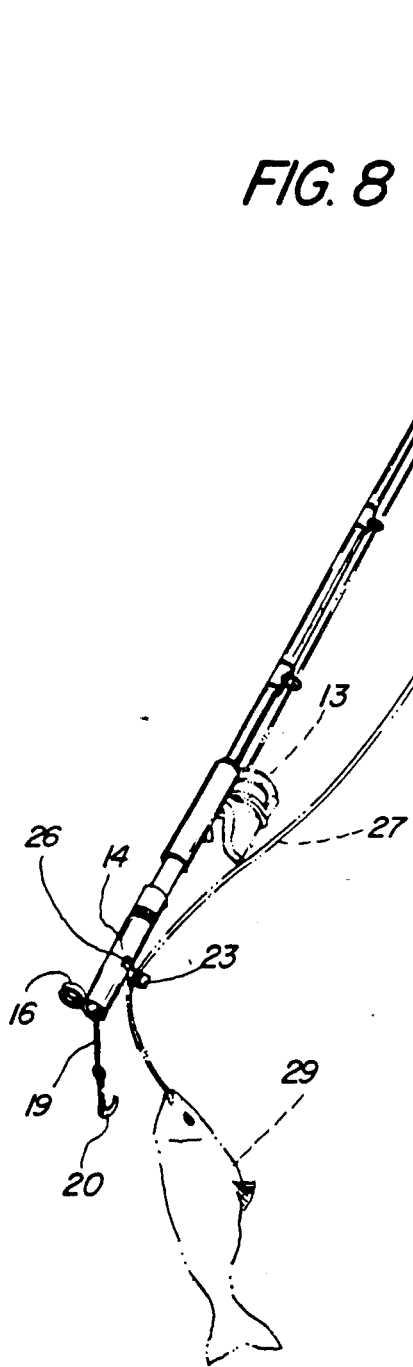
FIG. 8 is an isometric illustration of the modified invention in use in a first position.
Figure 9:
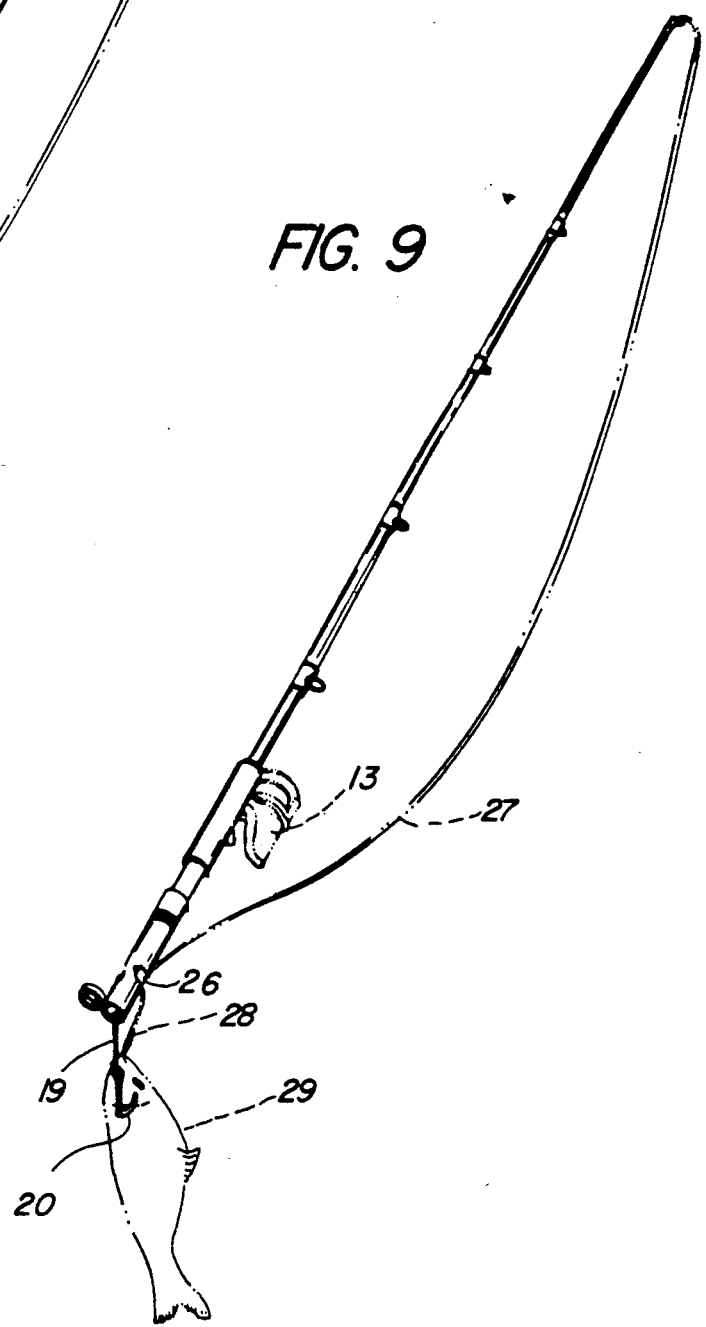
FIG. 9 is an isometric illustration of the modified invention for use in an operative second position.

With reference now to the drawings, and in particular to FIGS. 1 to 9 thereof, a new and improved fishing rod scale apparatus embodying the principles and concepts of the present invention and generally designated by the reference numeral 10 will be described.

More specifically, the fishing rod scale apparatus 10 of the instant invention essentially comprises an elongate fishing rod 11, including a handle 12 mounting a fishing reel 13 thereon. A fishing rod lower handle 14 mounted below the fishing rod handle 12 is coaxially aligned therewith, including a lower handle distal end 15. A lid member 16 is removably mounted relative to an opening of the lower distal end 15 for access to a lower handle cavity 18 directed within the lower handle 14. A weigh scale member 17 of a digital configuration, as set forth in U.S. Pat. No. 4,936,399 incorporated herein by reference, may be utilized or of a sliding spring scale type, as set forth in U.S. Pat. No. 4,765,420 incorporated herein by reference, as an example of a conventional sliding scale type utilized in the prior art. Alternatively, a rotary dial read-out 17b may be utilized, as illustrated in the FIG. 3. It should be noted that the type of read-out is of optional use by one of ordinary skill in the art for visual observation of an ultimate weight directed onto the apparatus of the invention.

A flexible support cable 19 accordingly is directed to the scale member 17 that includes a support hook 20 mounted to a free distal end of the support cable 19, with the hook 20 projecting from the lower handle lower distal end 15 and from the cavity 18, in a manner as illustrated in the FIGS. 1, 4, and 5 for example.

The FIG. 5 illustrates the use of a roller member 21 mounted within the wall of the lower handle member 14, with the roller member axle 22 positioned within the wall 14 to provide for accuracy in read-out of the organization. The roller member 21 is positioned within a handle wall recess 21a to direct the support cable 19 therethrough and about the roller member 21. In this manner, the roller axle 22 is orthogonally oriented relative to a radius relative to the lower housing axis 14a to orient the roller member 21 in a proper guiding orientation to position a fish to be weighed upon the support hook 20.

The FIGS. 6–9 illustrate the use of a lower handle latch plate 23 mounted within the wall of the lower handle 14 complementarily received within a lower handle opening 26. The latch plate 23 is formed with a latch plate hinge 24 hingedly mounting the latch plate relative to the wall portion of the fishing rod lower handle, and a latch plate handle 25 mounted to the latch plate extending therefrom for ease of manual grasping of the latch plate to permit ease of opening and closure of the latch plate relative to the lower handle 14. Further, the latch plate 23 includes a latch plate bottom wall 34 formed with a semi-cylindrical recess 33 coextensive therewith. In this manner, a fishing line 27 directed from the fishing reel 13 is received along the latch plate bottom wall 34, and more specifically within the semi-cylindrical recess 33, to effectively pinch and secure the fishing line 27 between the latch plate and the lower handle 14. For proper use of this organization, a fishing line forward portion 28 from the latch plate 23 to the fish member 29 is defined by a predetermined second length greater than a relative predetermined first length of the support cable 19. In this manner, slack is effected in the fishing line 27 forward portion between the latch plate 26 and the support hook 20 to permit a user thereof to merely position a fish 29 thusly caught for weighing upon the support hook 20 without need of removal of the fish from the fishing line 27. In this manner, fish of insufficient weight may be merely removed and tossed back. Further, the latch plate structure 26 properly orients the fish 29 for ease of weighing relative to the lower handle lower distal end 15.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A fishing rod scale apparatus, comprising,
   a fishing rod, the fishing rod including a fishing rod handle, and a fishing reel mounted to the handle, and
   fishing line directed from the fishing reel along the fishing rod, and
   a fishing rod lower handle fixedly mounted to the fishing rod handle coaxially aligned therewith below the fishing rod handle, and
   the fishing rod lower handle including a lower handle cavity directed therewithin, and
   a scale member mounted within the lower handle cavity projecting through a wall portion of the fishing rod lower handle adjacent the fishing rod handle, and
   a flexible support cable secured to the scale member, with the flexible support cable including a support hook mounted to a free distal end of the support cable spaced from the scale member, and
   the support cable and the support hook arranged for securement within the lower handle cavity, and
   the lower handle including a lower handle lower distal end, and
   a lid member arranged for selective securement to the lower handle lower distal end for access to the support cable and the support hook, and the wall portion of the lower handle includes a wall recess directed into the wall portion from the lower distal end, and a roller member axle mounted within the wall recess, and a roller member mounted about the roller member axle for directing the support cable about the roller member and through the wall recess for alignment of the support cable through the wall recess when mounting a fish member on the support hook.

2. An apparatus as set forth in claim 1 wherein the wall portion of the lower handle includes a latch plate opening directed through the wall portion positioned below the scale member, with the latch plate opening spaced from the lower handle lower distal end, and a latch plate pivotally mounted within the lower handle opening about a latch plate hinge, and a latch plate handle mounted to the latch plate spaced from the latch plate hinge for ease of opening and closure of the latch plate relative to the lower handle opening.

3. An apparatus as set forth in claim 2 wherein the latch plate includes a latch plate bottom wall, the latch plate bottom wall includes a semi-cylindrical recess directed therein for receiving the fishing line, and the latch plate arranged to arrest the fishing line relative to the lower handle when the fishing line is positioned within the semi-cylindrical recess and the latch plate is fastened within the lower handle opening.

4. An apparatus as set forth in claim 3 wherein the fishing line includes a fishing line free distal end, and the fishing line further defines a fishing line forward portion between the latch plate and the fishing line distal end of a second length, wherein the support cable is of a first length substantially less than the second length to effect slack in the fishing line forward portion between the latch plate and the support hook.

* * * * *